(12) United States Patent
Jakob (10) Patent No.: US 7,914,019 B2
(45) Date of Patent: Mar. 29, 2011

(54) COUNTERSTEERING REAR VEHICLE AXLE

(75) Inventor: Benjamin Jakob, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/861,326

(22) Filed: Aug. 23, 2010

(65) Prior Publication Data

US 2010/0314933 A1 Dec. 16, 2010

Related U.S. Application Data

(63) Continuation of application No. PCT/EP2009/002158, filed on Mar. 25, 2009.

(30) Foreign Application Priority Data

Apr. 7, 2008 (DE) .................. 10 2008 001 030

(51) Int. Cl.
  *B62D 17/00* (2006.01)
  *B60G 11/18* (2006.01)
  *B60G 11/16* (2006.01)
  *B60G 3/18* (2006.01)
  *B60G 9/02* (2006.01)

(52) U.S. Cl. ....... 280/86.75; 280/124.107; 280/124.125; 280/124.166; 280/93.512

(58) Field of Classification Search .............. 280/86.75, 280/86.758, 93.51, 93.512, 124.107, 124.116, 280/124.125, 124.128, 124.148, 124.153, 280/124.166, 124.167

See application file for complete search history.

(56) References Cited

U.S. PATENT DOCUMENTS

| 6,173,977 | B1 | 1/2001 | Fun | |
|---|---|---|---|---|
| 6,241,262 | B1* | 6/2001 | Suess | 280/5.522 |
| 7,270,340 | B2* | 9/2007 | Mosler | 280/93.512 |
| 2006/0082091 | A1* | 4/2006 | Mosler | 280/93.512 |
| 2006/0082094 | A1 | 4/2006 | Mosler | |

FOREIGN PATENT DOCUMENTS

| DE | 2 81 154 A5 | 8/1990 |
|---|---|---|
| DE | 195 17 074 A1 | 11/1996 |

(Continued)

OTHER PUBLICATIONS

German Search Report dated Feb. 5, 2009 with partial English translation (nine (9) pages).

(Continued)

*Primary Examiner* — Eric Culbreth
*Assistant Examiner* — Joseph Rocca
(74) *Attorney, Agent, or Firm* — Crowell & Moring LLP (57) ABSTRACT

A countersteering rear vehicle axle, which under the effect of a lateral force upon the wheel that is outside during cornering and is fastened to a wheel carrier, causes a rotating movement of this wheel carrier about a virtual steering axle inclination in the toe-in direction. The wheel carrier is supported by supporting elements on an axle body extending essentially in the longitudinal direction of the vehicle. Above and below the wheel center, in each case, two torsionally soft but bend-resistant supporting elements are provided which are essentially equally inclined with respect to the vertical direction. An upper linkage supporting element is supported, on the one side, on the wheel carrier and, on the other side, on an upper torsion supporting element which is supported on the axle body. A lower linkage supporting element is supported on the wheel carrier, on the one side, and on a lower torsion supporting element, on the other side.

7 Claims, 7 Drawing Sheets

FOREIGN PATENT DOCUMENTS

| | | |
|---|---|---|
| DE | 103 21 877 A1 | 12/2004 |
| DE | 103 21 877 B4 | 4/2005 |
| DE | 603 15 541 T2 | 5/2008 |
| EP | 1 527 911 A1 | 5/2005 |
| EP | 1 612 068 A1 | 1/2006 |
| EP | 2 019 023 A1 | 1/2009 |
| FR | 2 860 751 A1 | 4/2005 |
| FR | 2 902 698 A1 | 12/2007 |

OTHER PUBLICATIONS

International Search Report dated Jun. 6, 2009 with English translation (six (6) pages).

* cited by examiner

COUNTERSTEERING REAR VEHICLE AXLE

CROSS-REFERENCE TO RELATED APPLICATIONS

This application is a continuation of PCT International Application No. PCT/EP2009/002158, filed Mar. 25, 2009, which claims priority under 35 U.S.C. §119 from German Patent Application No. DE 10 2008 001 030.8, filed Apr. 7, 2008, the entire disclosures of which are herein expressly incorporated by reference.

BACKGROUND AND SUMMARY OF THE INVENTION

The invention relates to a countersteering rear vehicle axle which, under the effect of a lateral force upon the wheel that is outside during cornering and is fastened to a wheel carrier, causes a rotational movement of this wheel carrier about a virtual steering axle inclination in the toe-in direction. The wheel carrier is supported by way of supporting elements on an axle body extending essentially in the longitudinal direction of the vehicle. Concerning the known state of the art, reference is made, for example, to German Patent Documents DD 281 154 A5 as well as DE 103 21 877 B4.

It is known that basic rear vehicle axles, particularly of the compound link type, but also of the longitudinal link and trailing arm type, may have an oversteering tendency under the influence of lateral force. Remedial measures against this tendency are also already known from the above-mentioned state of the art. Thus, German Patent Document DE 103 21 877 B4 shows a wheel carrier bearing with a so-called swing plate, in which four elastic pivot bearings are integrated. By way of this extremely high-expenditure construction, under the influence of lateral force, the wheel on the outside during cornering is steered in the toe-in direction and the wheel on the inside during the cornering is steered in the toe-out direction, whereby the axle has a stabilizing effect. The same takes place in the case of a constructively considerably simpler, so-called countersteering rear axle according to the German Patent Document DD 281 154 A5, but the structural durability of a plate-shaped spring element that is provided there and carries the wheel carrier leaves a great deal to be desired.

There is therefore needed a relatively simply constructed so-called countersteering rear axle which meets the general durability requirements of vehicle axles for example for passenger cars.

This need is met in that two torsionally soft but bending-resistant supporting elements are, in each case, provided above and below the wheel center. In a lateral projection comparable to the virtual steering axle inclination, the supporting elements are essentially equally inclined with respect to the vertical direction. An upper linkage supporting element, which extends essentially in the transverse direction of the vehicle toward the inside, is supported, on the one side, on the wheel carrier and, on the other side, on an upper torsion supporting element which, by means of its other end, is supported on the axle body, while a lower linkage supporting element, which extends essentially in the vertical direction, is supported on the wheel carrier, on the one side, and on a lower torsion supporting element, on the other side. The lower torsion supporting element is supported on the axle body by means of its other end.

The wheel carrier is supported on the axle body by at least four supporting elements, which axle body may, for example, be the longitudinal tube of a compound link or a link in general (longitudinal link or trailing arm) of the wheel suspension. Each of these supporting elements has an essentially bend-resistant but torsionally soft construction. Because of the bending resistance of these supporting elements arranged as indicated above, a sufficiently structurally durable support is provided with respect to longitudinal forces as well as vertical forces acting upon the wheel or upon the wheel carrier. However, as a result of the torsional softness of these elements, a desired slight torsion of the wheel or the wheel carrier under the influence of lateral force becomes possible about a steering axle inclination (also called steering axle) formed essentially by these supporting elements or their "thrust centers," which will be further discussed in the following. In this case, an arrangement of four such supporting elements, which are each formed by appropriately shaped longitudinal profiles, is considerably simpler constructionally than, for example, the arrangement with four elastic pivot bearings known from the above-mentioned German Patent Document DE 103 21 877 B4.

As far as the design and arrangement of the, in each case, essentially bend-resistant but torsionally soft supporting elements in the form of longitudinal profiles, i.e. of profiled rods, each having a suitably profiled cross-section, are concerned, the supporting elements arranged above the wheel center and the supporting elements arranged below the wheel center preferably are to be designed and arranged such that, viewed in the transverse direction of the vehicle, the thrust centers of the upper supporting elements are situated significantly closer to the center of the vehicle or of the axle than the thrust centers of the lower supporting elements. In other words, this means that, viewed in the transverse direction of the vehicle, the thrust center of each supporting element situated above the wheel center is situated at a significant distance from the thrust center of each supporting element situated below the wheel center. As known, the thrust center (also called lateral-force center or torsional point of rest) of a profiled cross-section is that point through which the resultant force of the transverse forces acting upon the profiled cross-section has to extend when a no-torsion force effect is to be reached and therefore no torsion is to be exercised upon this profiled cross-section.

A preferred profiled cross-section, by which a corresponding position of the thrust centers, by which finally the position of the virtual steering axle inclination of the wheel carrier is also defined in space, can easily be implemented, is formed by an essentially U-shaped profile whose thrust center, as known, is situated outside the profiled cross-section below the base of the profile. When profiled rods are used as the supporting elements which are essentially U-shaped in their cross-section, it is therefore recommended to arrange the two supporting elements that are above the wheel center (but at least the upper so-called torsion supporting element) such that the two legs extend in the transverse direction of the vehicle and the profile base faces the center of the vehicle; i.e. that the profile is open toward the wheel. In contrast, the two supporting elements that are below the wheel center (but at least the lower so-called torsion supporting element) should be arranged such that the two legs extend in the transverse direction of the vehicle and the profile base faces the exterior side of the vehicle; i.e. the profile is open toward the vehicle center.

In this case, it should be pointed out explicitly that the use of U-profiles is definitely not required for achieving the effect according to the invention, although the best result may be achieved in this manner. For the supporting elements, profiles having a semicircular cross-section or profiled rods or longitudinal profiles having a T- or L- or X-cross-section, or other suitable cross-sections, can be used as an alternative. (Reference will be made to the preceding statements concerning the thrust centers of the individual supporting elements at a later point in the description of an embodiment in the figures under the term "thrust center theory").

Viewed in the longitudinal direction of the vehicle, the virtual steering axle inclination is defined essentially by the two torsion supporting elements and—depending on the profiled cross-section selected for these torsion supporting elements or for all supporting elements—can essentially extend in the direction of the upper and of the lower torsion supporting element. Preferably, these (as well as the virtual steering axle inclination) are inclined in the transverse direction of the vehicle essentially in the same manner with respect to the vertical line such that a negative steering offset is formed—for achieving its basically known advantages. In particular, by way of such a negative steering offset during braking operations and therefore under the influence of longitudinal force, a desired moving of the wheel in the toe-in direction can also be generated, i.e., the wheel or the wheel carrier can be swung about the virtual steering axle inclination in the toe-in direction.

In addition to being supported by the above-mentioned four supporting elements, the wheel carrier can be supported, preferably again on the above-mentioned axle body, by at least one additional connecting element away from the steering axle inclination, which connecting element has a certain softness. This softness permits the desired swinging motion of the wheel carrier about the virtual steering axle inclination, in which case this connecting element can influence and particularly also dampen the intensity of the swinging motion. For example, a rubber bearing, which is soft in the axial direction, can be used as such a connecting element, the axial direction extending tangentially with respect to the rotating direction of the wheel carrier about the virtual steering axle inclination. As a result, the torsional softness about the steering axle inclination can be adjusted and thus also the elasto-kinematic toe-in steering behavior of the axle. As mentioned above, such a connecting element having a certain softness can dampen particularly torsional vibrations about the virtual steering axle inclination and furthermore reduce the axle windup during braking operations. In addition, such a connecting element can transmit forces during the compression of the wheel. Advantageously, toe adjustment of the axle can also be carried out at this point. It is also explicitly pointed out again that a rubber bearing does not necessarily have to be used as the connecting element, but rather the connecting element can also be formed by a suitable structural component that has the above-mentioned "softness" in the above-described direction.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
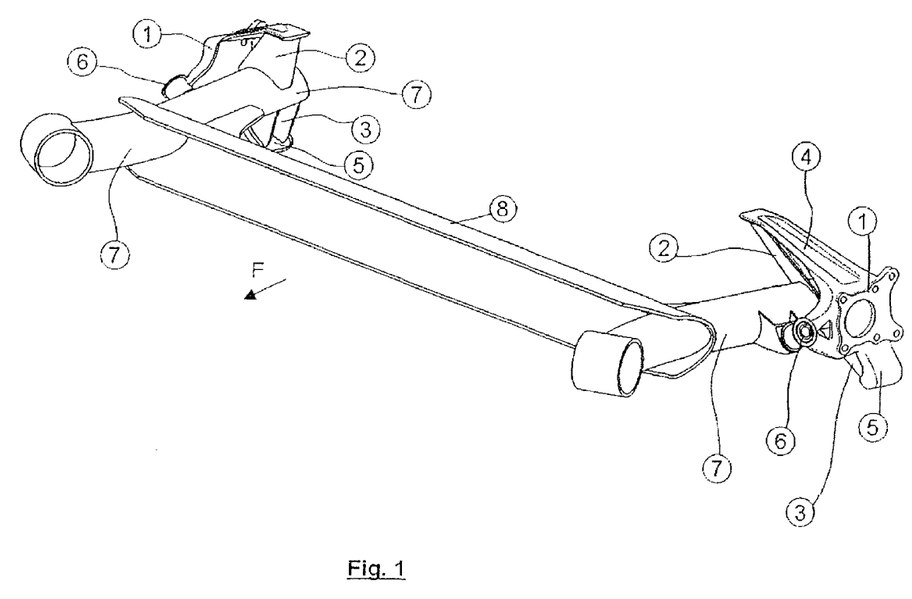
FIG. 1 is a spatial view of an axle according to an embodiment of the invention when viewed from the diagonal left front.
Figure 2:
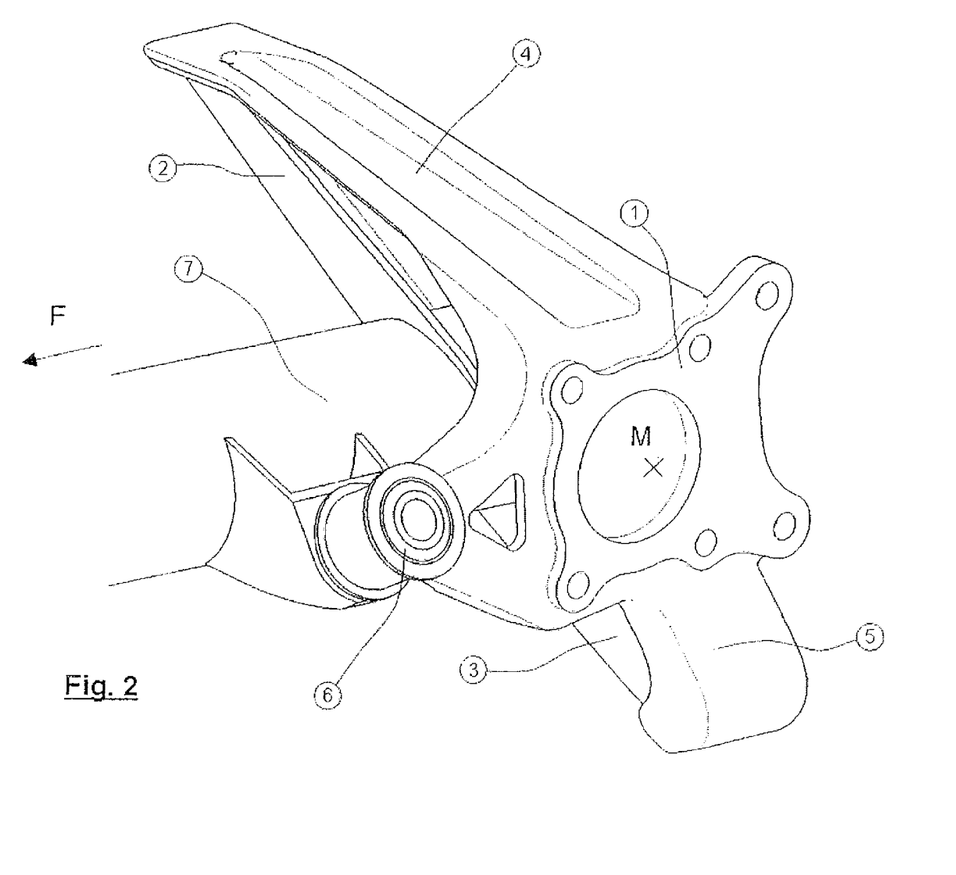
FIG. 2 is an enlarged view of the area of the left-side wheel carrier (with supporting elements) from FIG. 1.
Figure 3:
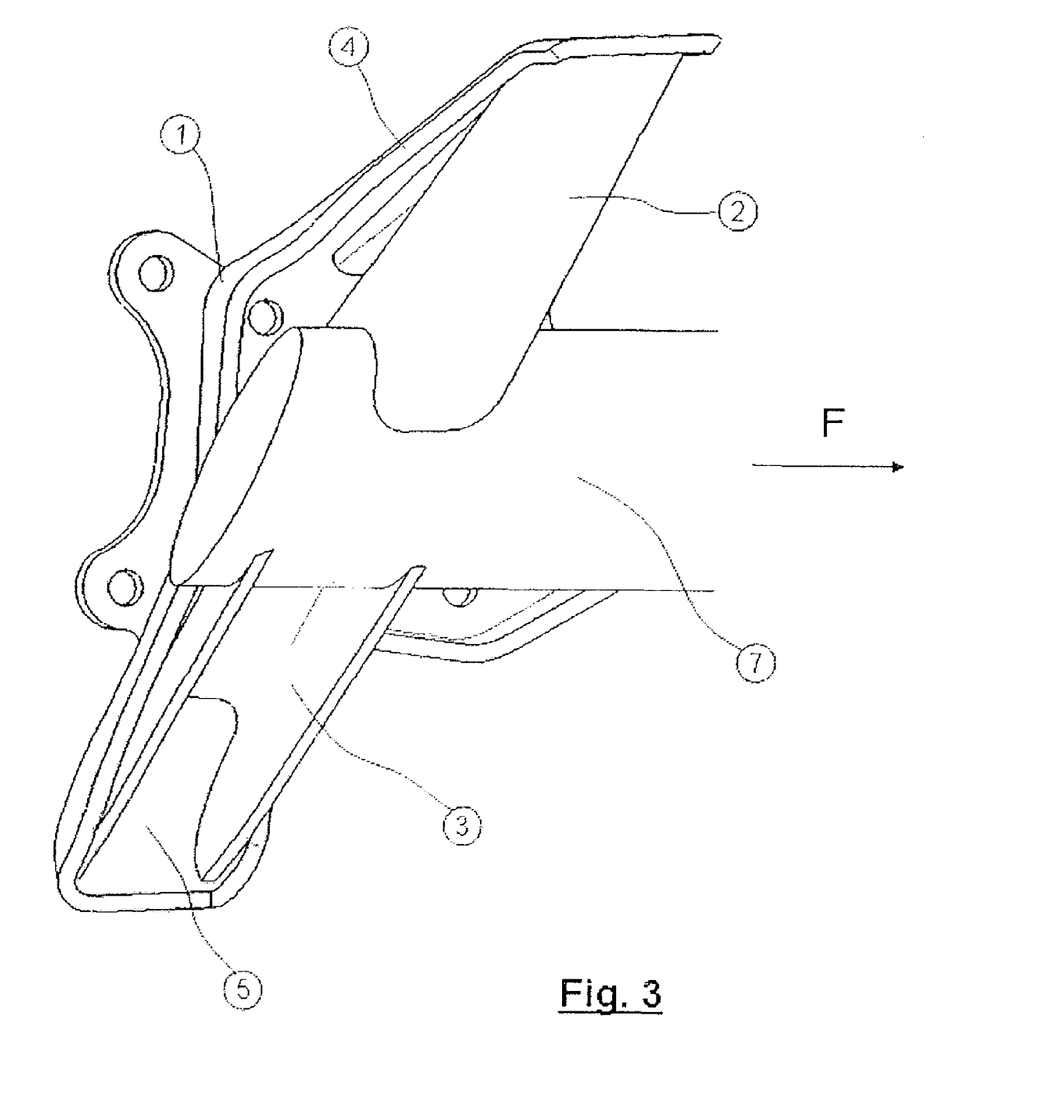
FIG. 3 is a spatial views of the wheel carrier from FIG. 2 (with supporting elements) from the diagonal interior rear.

With reference to FIGS. 1-3, reference number 1 designates the wheel carrier of a rear vehicle axle which may, for example as illustrated in this case, be a so-called compound link axle whose construction is basically known to a person skilled in the art. For each wheel, i.e. on the left side and on the right side, in each case, this axle has a so called axle body 7 (here in the form of a longitudinal tube) which extends essentially in the longitudinal direction of the vehicle. The two axle bodies 7 are mutually connected by way of a bend-resistant but torsionally soft compound profile 8 extending in the transverse direction of the vehicle.

Figure 6:
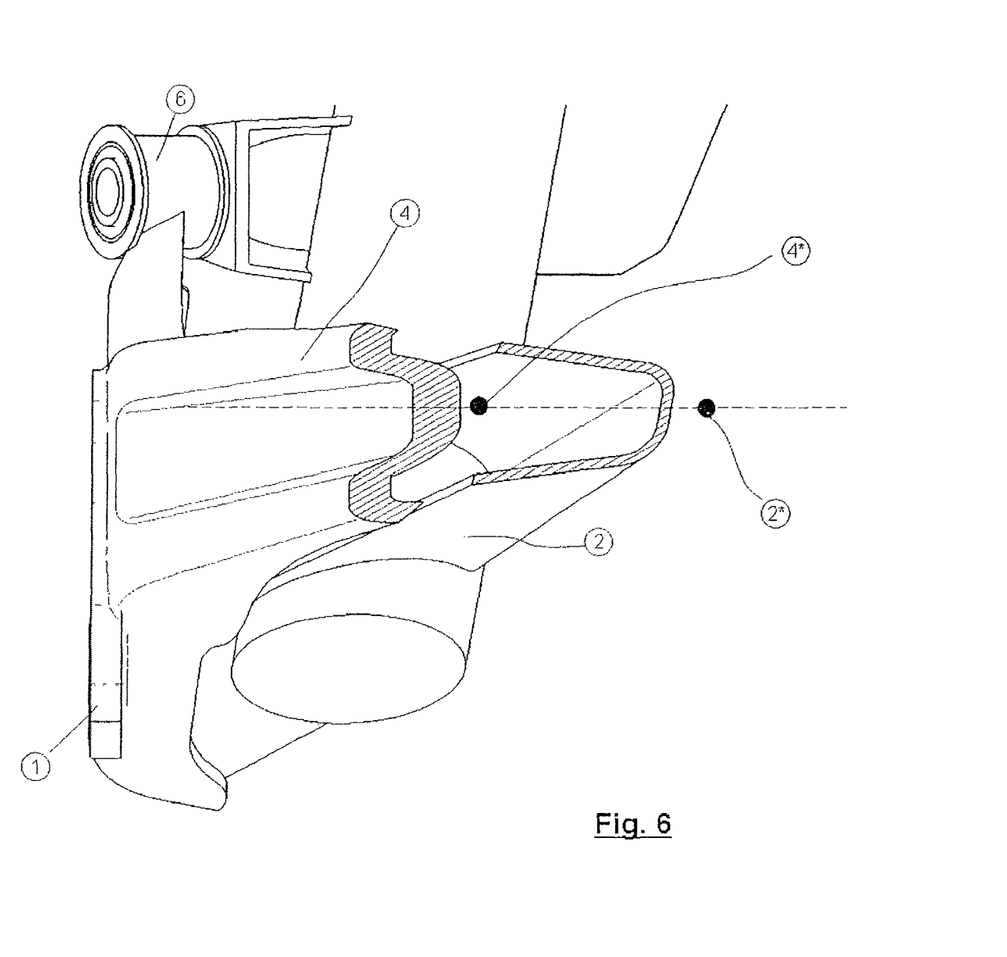
FIG. 6 is a sectional view A-A from FIG. 5.

Each wheel carrier 1 is supported on the axle body 7 assigned to it by way of at least four supporting elements 2, 3, 4, 5, which are essentially bend-resistant but torsionally soft longitudinal profiles or profiled rods which here have essentially U-shaped profiled cross-sections (compare FIGS. 6, 7 explained below). Furthermore, the wheel carrier is supported on the axle body 7 by way of a further connecting element 6, which, however, is not absolutely necessary.

A so-called upper linkage supporting element, which is called upper because it generally extends above the wheel center M (or center M of the wheel carrier 1) and is designated by the reference number 4, extends essentially in the transverse direction of the vehicle and is supported, on the one side, on the wheel carrier 1 and, on the other side, is supported on or fixedly connected to an upper torsion supporting element 2 which, by means of its other end, is supported on the axle body 7 or is fixedly connected with the axle body 7. A lower linkage supporting element 5, which is called lower because it generally is situated below the wheel center M, extends essentially in the vertical direction, is supported on the wheel carrier 1, on the one side, and is supported on or fixedly connected with a lower torsion supporting element 3, on the other side. The lower torsion supporting element 3 is supported on the axle body 7 by its other end or is fixedly connected with the axle body 7. In this case, it is explicitly pointed out that the linkage supporting element 4 and/or the linkage supporting element 5 can definitely be an integral component of the wheel carrier 1.

Figure 4:
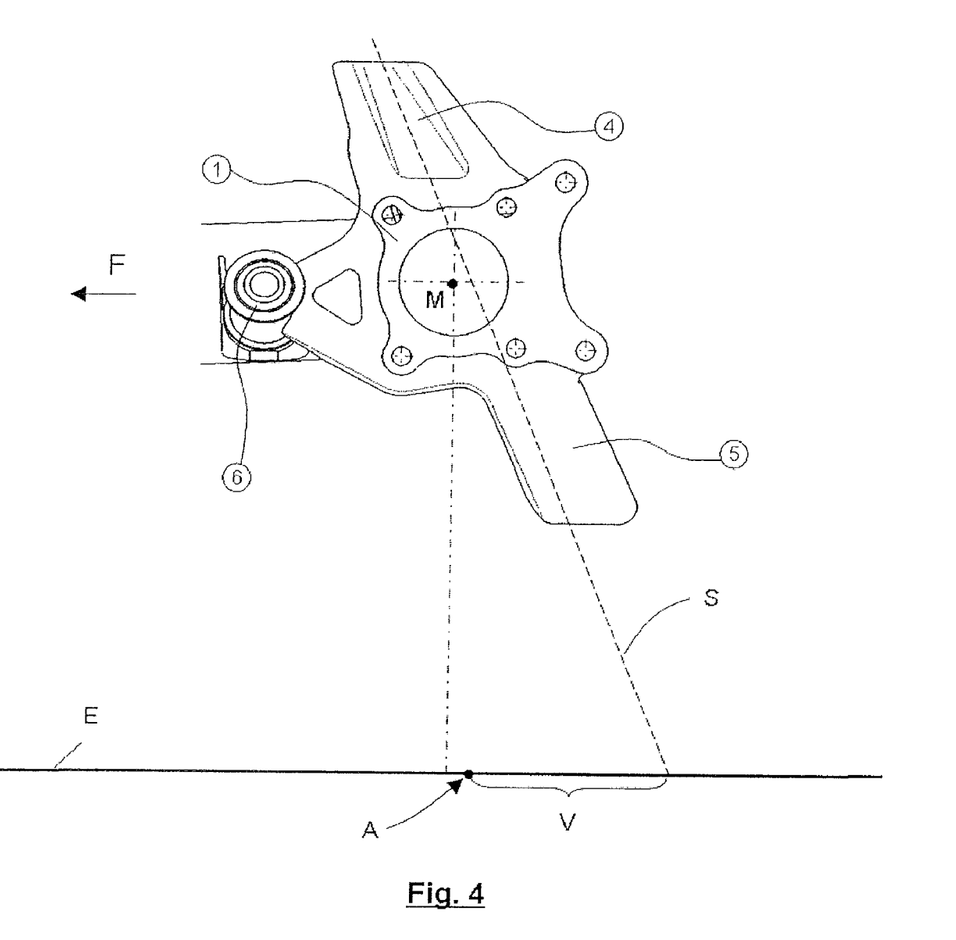
FIG. 4 is a lateral view of the wheel carrier (with supporting elements) from FIG. 2.
Figure 5:
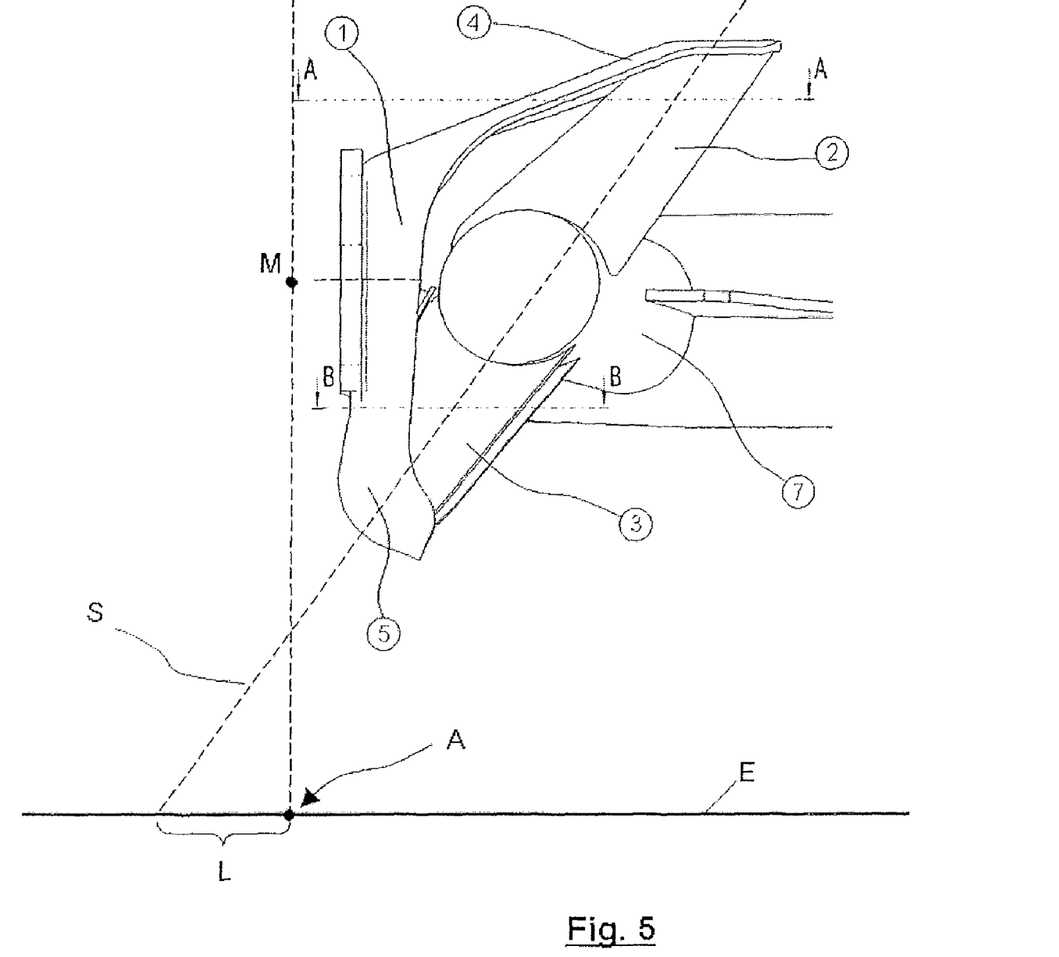
FIG. 5 is a view of the wheel carrier (with supporting elements) from FIG. 2 when viewed from the rear in the driving direction.

With reference to the so-called "thrust center theory" mentioned previously, the upper torsion supporting element 2, together with the linkage supporting element 4 quasi connected in series with the latter, defines, viewed in the vertical direction, at least one upper point of a virtual steering axle inclination S formed by the essentially bend-resistant but torsionally soft supported elements 2, 3, 4, 5 and illustrated in FIGS. 4 and 5. About this virtual steering axle inclination S, the wheel carrier 1 (or the wheel not illustrated in the figures but which would be fastened to the wheel carrier 1), under the influence of lateral force acting upon this wheel, swings or can swing slightly in the toe-in direction (if it is a wheel that is on the outside during a cornering) or in the toe-out direction (if it is a wheel that is on the inside during a cornering).

Analogously, the lower torsion supporting element 3, together with the linkage supporting element 5 connected in series with the latter, defines at least one lower point of this virtual steering axle inclination S. In this context, it is pointed out that, as a result of the constructive series connection of the respective torsion supporting element 3 and 5 respectively and of the respective linkage supporting element 2 and 4 respectively, an advantageous series connection of the respective stiffnesses relative to torsion is formed, whereby the total stiffness against torsion is reduced in the desired manner. As far as the bending resistance of the individual supporting elements 2-5 is concerned, the latter should in each case be as high as possible because, as a result of the implemented series connection, the overall bending resistance is reduced.

As illustrated in FIG. 4, in which the driving direction of the vehicle is shown by an arrow F, as a result of the arrangement of the four supporting elements 2, 3, 4 and 5 in the same inclination with respect to the vertical line in the lateral view, the projection of the (virtual) steering axle inclination S is defined in the lateral view. As a result, viewed in the wheel contact plane E, a negative caster offset V is obtained with respect to the wheel contact point A, which, in the case of a lateral force acting upon the wheel on the outside during cornering, perpendicular to the plane of the drawing in this representation of the figures, causes a toe-in steering and thereby an understeering stabilizing vehicle behavior.

As illustrated in FIG. 5, viewed in the longitudinal direction of the vehicle, the virtual steering axle inclination S is defined essentially by the two torsion supporting elements 2, 3 and may—as a function of the profiled cross-section selected for these or for all supporting elements 2, 3, 4, 5, extend essentially in the direction of the upper and of the lower torsion element 2 and 3 respectively. These as well as the virtual steering axle inclination S are essentially inclined in the same manner such that a negative steering offset L is formed—for achieving its basically known advantages. As illustrated in FIG. 6, for this purpose, the two supporting elements 2 and 4 situated above the wheel center M are constructed such that their thrust centers 2\* and 4\* respectively, viewed in the transverse direction of the vehicle, are situated significantly closer to the center of the vehicle (situated on the right side in FIG. 6) than the thrust centers 3\* and 5\* respectively of the supporting elements 3 and 5 situated below the wheel center M and illustrated in FIG. 7. In this case, the desired virtual steering axle inclination could be generated in an extremely precise manner if the thrust centers of all supporting elements 2, 3, 4, 5 were to be situated on a straight line, but this cannot be completely implemented in reality. However, when U-shaped profiles are used for the supporting elements 2-5, these can be arranged—as implemented here in the case of the two supporting elements 3 and 5—in a mutually interlaced manner, so that the above-mentioned criterion can be met relatively well.

Figure 7:
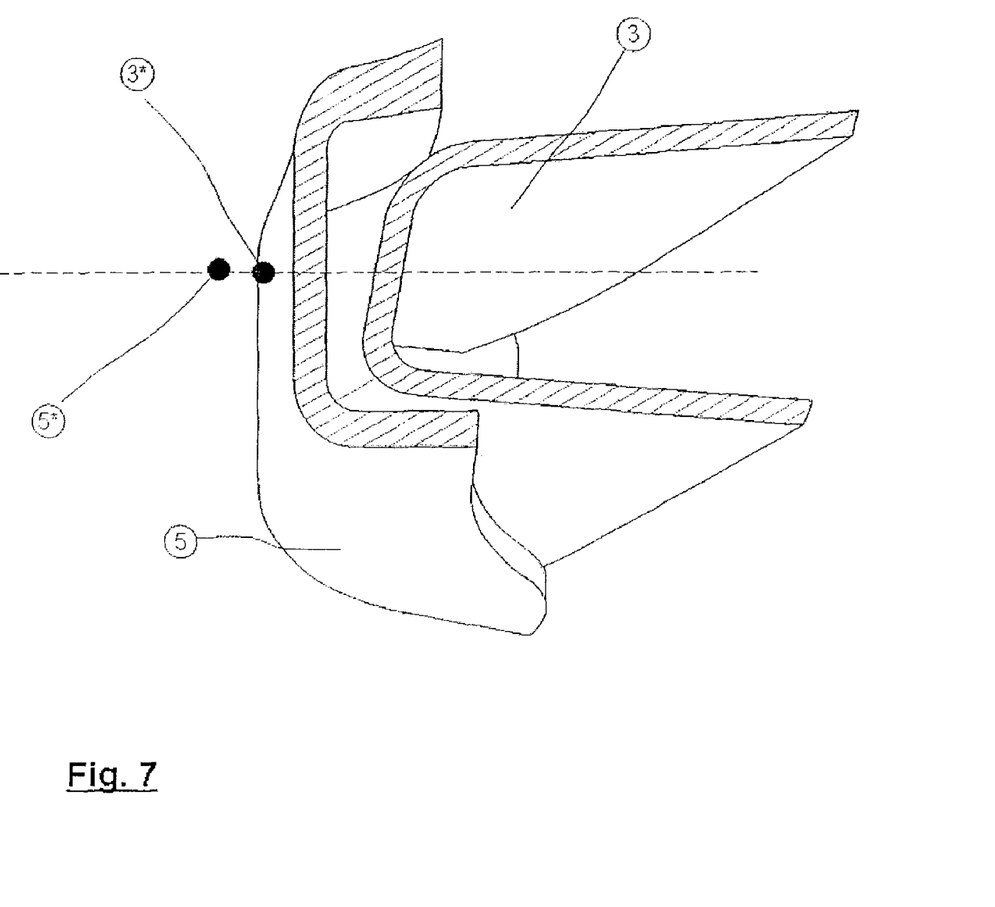
FIG. 7 is a sectional view B-B from FIG. 5.

An (above-mentioned) vertically upper point of the steering axle inclination S is thereby directly or indirectly obtained from the (upper) thrust centers 2\* and 4\* respectively of the upper supporting elements 2 and 4 and, viewed in the transverse direction of the vehicle, is therefore placed closer toward the vehicle center (on the right side in FIG. 6) than an (above-mentioned) lower point of the steering axle inclination which is directly or indirectly obtained from the (lower) thrust centers 3\* and 5\* of the lower supporting elements 3 and 5 and is preferably positioned such that, viewed in the transverse direction of the vehicle, the latter is situated as far to the outside as possible (on the left side in FIG. 7). The supporting elements 2, 3, 4, 5 are constructed correspondingly; i.e., here, in the case of profiled cross-sections, which are essentially U-shaped (with a base situated between two legs), of the supporting elements 2, 3, 4, 5, the base of the upper supporting elements 2 and 4, viewed in the transverse direction of the vehicle, points to the interior toward the vehicle center, while the base of the lower supporting elements 3, 5, viewed in the transverse direction of the vehicle, faces the exterior side of the vehicle. When, for example, the lower thrust centers 3\*, 5\* are placed farther toward the outside (toward the left in FIG. 7), the lower steering axle inclination point also moves farther toward the outside, and the steering offset L increases in the "negative" direction, which has a stronger understeering effect during braking. In addition, a variation of the wall thicknesses of the supporting elements 2, 3, 4, 5 can also change their stiffness with respect to torsion or their softness with respect to torsion and thus can change the understeering effect that can be achieved by the axle, if permitted by the structural durability requirement of the components.

FIGS. 1, 2 and 4 show an already briefly described further connecting element 6, here, in the form of a rubber bearing, which has a certain softness in the axial direction—the latter extends essentially perpendicularly to the plane of the drawing—, and by way of which the wheel carrier 1 away from the virtual steering axle inclination S is additionally supported at the axle body 7. By means of this soft support, the swinging motion of the wheel carrier 1 about the steering axle inclination S, which takes place particularly under the influence of lateral force, as a function of the steering offset but also under the influence of longitudinal force, can be adjusted in a desired manner and, in particular, can also be damped. The additional advantages of such a connecting element 6 were explained before the description of this embodiment.

A rear-axle construction is particularly suitable for compound link axles or longitudinal link axles or trailing arm axles or rigid axles, or for all axles which, especially in the case of lateral force, possibly also in the case of longitudinal force, may "move in the toe-out direction" in an unintended manner. A characteristic is the fact that, as a result of torsionally soft components, specifically as a result of the here co-called supporting elements 2, 3, 4, 5, a virtual steering axle inclination S is formed, whose intersection with the wheel contact plane E, viewed in the driving direction F, is situated behind the wheel contact point (compare FIG. 4) and preferably, additionally viewed in the transverse direction of the vehicle, is situated outside the wheel contact point A (compare FIG. 5), so that a negative caster offset V is obtained and with the additional criterion advantageously a negative steering offset L is obtained.

For achieving these driving-dynamically positive characteristics, in the simplest case, no additional rubber bearings or ball-and-socket bearings are required, possibly only the additional connecting element 6 shown here, so that a simple and cost-effective axle construction is present.

Here, it is also pointed out that a large number of details may be designed in a manner deviating from the above explanations without leaving the scope of the claims. As just a few examples, instead of the approximately rectangular U-shaped torsion profiles which are used here for the supporting elements 2, 3, 4, 5 and which are closed above the wheel center M toward the vehicle center and are open below the wheel center M toward the vehicle center, other suitable profiled cross-sections can also be used, such as thin-walled round, slotted profiles or T-profiles, L-profiles or X-profiles. In any case, by means of the presently selected, cross-sectionally essentially U-shaped profiled rods for the above-mentioned supporting elements 2, 3, 4, 5, the above-explained thrust points (2\*, 3\*, 4\*, 5\*) as well as the desired virtual steering axle inclination S are obtained. Advantageously, the profiled cross-sections selected here have a very high bending resistance, which results in a high camber stiffness of the wheel carrier 1. Furthermore, especially the axle body 7 may be widened in the area of the wheel axle extending through the wheel center M, in order to create a passage for an output shaft, so that a rear axle according to the invention can definitely also be driven.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A countersteering rear vehicle axle for causing a rotational movement of a wheel carrier about a virtual steering axle inclination in a toe-in direction under the effect of a lateral force upon a wheel that is outside during cornering and is fastened to the wheel carrier, the rear vehicle axle comprising:

an axle body extending essentially in the longitudinal direction of the vehicle, the wheel carrier being supported on the axle body;

torsionally soft but bend-resistant supporting elements arranged, in each case, above and below the wheel center, said supporting elements, in a lateral projection corresponding to the virtual steering axle inclination, being essentially equally inclined with respect to a vertical direction, an upper linkage one of said supporting elements, which extends essentially in a transverse direction of the vehicle toward the inside, being supported, on the one side, on the wheel carrier and, on the other side, on an upper torsion one of said supporting elements whose other end is supported on the axle body, while a lower linkage one of said supporting elements, which extends essentially in the vertical direction, is supported on the wheel carrier, on the one side, and on a lower torsion one of said supporting elements, on the other side, the lower torsion supporting element being supported on the axle body by its other end.

2. The rear vehicle axle according to claim 1, wherein the supporting elements arranged above the wheel center have cross-sectionally essentially U-shaped longitudinal profiles arranged such that, viewed in the transverse direction of the vehicle, upper thrust centers of the upper supporting elements are situated significantly closer to the vehicle center than lower thrust centers of the lower supporting elements.

3. The rear vehicle axle according to claim 2, wherein, viewed in the longitudinal direction of the vehicle, the upper and lower torsion supporting elements delineating the virtual steering axle inclination are inclined essentially in the same manner with respect to the vertical line such that a negative steering offset is formed.

4. The rear vehicle axle according to claim 2, wherein the wheel carrier away from the virtual steering axle inclination is supported at the axle body by an additional connecting element having a defined softness.

5. The rear vehicle axle according to claim 1, wherein, viewed in the longitudinal direction of the vehicle, the upper and lower torsion supporting elements delineating the virtual steering axle inclination are inclined essentially in the same manner with respect to the vertical line such that a negative steering offset is formed.

6. The rear vehicle axle according to claim 5, wherein the wheel carrier away from the virtual steering axle inclination is supported at the axle body by an additional connecting element having a defined softness.

7. The rear vehicle axle according to claim 1, wherein the wheel carrier away from the virtual steering axle inclination is supported at the axle body by an additional connecting element having a defined softness.

* * * * *